Dec. 8, 1931.   E. W. DICHMAN   1,835,022
AIRCRAFT
Filed Dec. 5, 1929
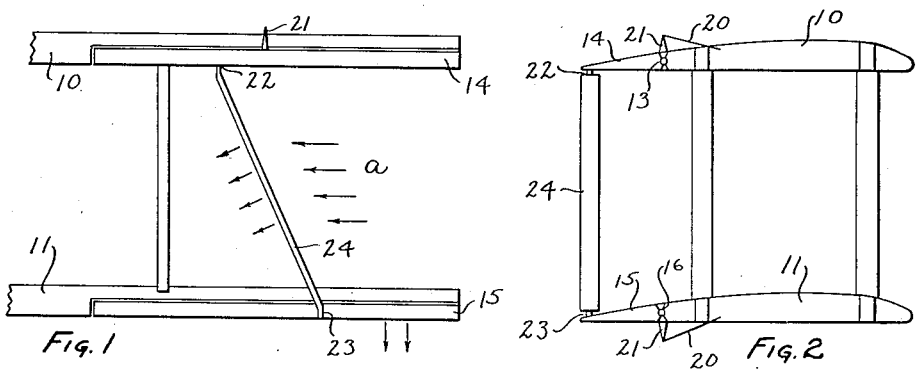
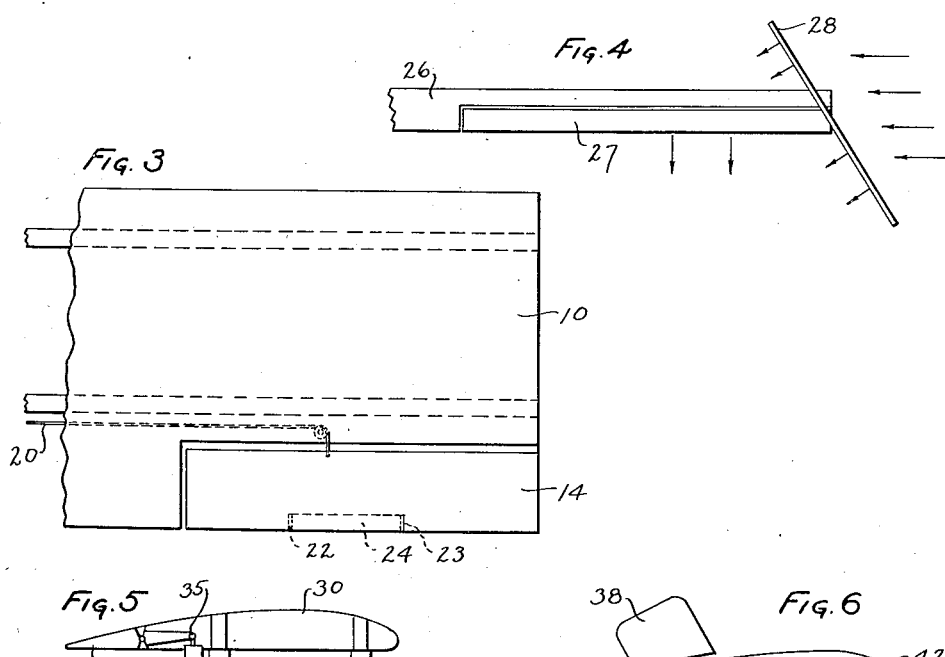
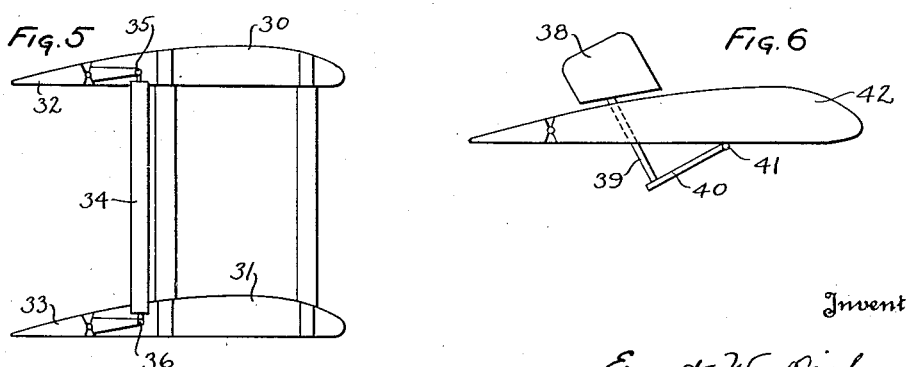
Inventor
Ernest W. Dichman
By Maréchal & Noé
Attorney Patented Dec. 8, 1931

1,835,022

UNITED STATES PATENT OFFICE

ERNEST W. DICHMAN, OF NEW YORK, N. Y.

AIRCRAFT

Application filed December 5, 1929. Serial No. 411,785.

This invention relates to an aircraft, and more particularly to means for effecting the lateral control of aircraft such as airplanes and the like.

One object of the invention is the provision of a lateral control for aircraft embodying an aerofoil connected to a lateral control device, the aerofoil being arranged at a suitable inclination and presenting a substantial area laterally so that a substantial force component is produced during side slip to automatically operate or tend to operate the lateral control device to correct for side slip.

Further objects and advantages of the invention will be apparent from the following description and claims, and the accompanying drawings.

In the drawings—

Fig. 1 is a rear elevation of one side of an airplane, embodying the present invention;

Fig. 2 is a side elevation of the same;

Fig. 3 is a top plan view of the same;

Fig. 4 is a rear elevation of a part of an airplane embodying a modified form of my invention;

Fig. 5 is a side elevation of an airplane embodying still another modification of my invention; and Fig. 6 is a side elevation of an airplane wing embodying still another form of my invention.

Referring to the drawings by reference numerals, and more particularly with respect to Figs. 1 to 3 thereof, 10 and 11 designate the upper and lower fixed sustaining surfaces of a biplane, it being understood that these sustaining surfaces may be suitably connected in any usual or desirable manner to a fuselage nacelle or boat structure. As shown, the sustaining surfaces 10 and 11 extend laterally in a substantially horizontal direction, although if desired they may be arranged at a small inclination to the horizontal.

Lateral control devices in the form of ailerons 14 and 15 are provided at each side of the airplane, these ailerons being pivotally connected at the rear of the sustaining surfaces on axes 13 and 16 respectively, these axes extending in a substantially horizontal and transverse direction, as shown.

Suitable means, such as the manually operable wires 20 connected to the control horns 21 are preferably provided for manually controlling the position of the ailerons during normal flight, it being understood that the two ailerons on the right side of the airplane may be depressed while the two left-hand ailerons are raised, or vice versa, for manually controlling the lateral inclination of the airplane.

To effect an automatic control of the position of the ailerons during side slip or sidewise movements of the airplane that may occur for example when the airplane is tilted laterally at a substantial angle, the ailerons or lateral control surfaces are controlled by an aerofoil or aerofoils which are arranged at a lateral inclination so as to present a substantial area laterally during side slip. This aerofoil while offering little resistance to forward flight, is acted on by the air during side slip for the creation of a force having a substantial vertical component, and due to the fact that the aerofoil is connected directly to the lateral control surface the latter will be automatically moved, provided the manual control is free. If the manual control lever is held by the pilot the force created by the automatic aerofoil operation will direct or control the movements given to the control lever. The lateral control surface or aileron on the low side of the airplane is thus moved down automatically to increase the lift on the low side of the airplane and thus restore the latter to horizontal or safe lateral inclination.

As shown in Figs. 1 to 3, the ailerons 14 and 15 are connected at the points 22 and 23 to the aerofoil 24, this aerofoil serving also as a strut or tie between the two ailerons so they may move similarly in unison. It is preferably positioned so as to offer a minimum of resistance to forward flight, lying in a plane which is parallel, or substantially parallel to the line of forward flight, but as seen in Fig. 1, the strut or aerofoil 24 is inclined laterally, extending laterally and downwardly from the upper aileron to the lower aileron. As the points of attachment 22 and 23 are at a substantial distance from the aileron axes 13 and 16, it will be apparent that during sidewise movement of the airplane the air acts on the aerofoil 24 in the direction of the arrows a in Fig. 1 for the creation of a force on the aerofoil 24 which has a substantial vertical component, in this case downward. This downward force on the rear ends of the ailerons causes them to move down automatically thus increasing the lift on the lower side of the airplane and tending to immediately right the same.

It will be understood that the ailerons on the opposite side of the airplane will be correspondingly arranged and that the two aerofoils on the two opposite sides of the airplane will act together in creating a restoring moment of the ailerons. It will be apparent that as viewed in Fig. 1, if the airplane is moved downwardly towards the lift, and the ailerons 14 and 15 seen in Fig. 1 are on the high side of the airplane, the force on the aerofoil 24 will be an upward force as the air is directed in this case in a direction reverse to that shown by the arrows.

Referring now more particularly to Fig. 4, showing a construction that is particularly adapted for monoplanes but one that is also applicable to multi-planes, the laterally extending fixed sustaining surface 26 is shown provided with the aileron 27 pivotally connected thereto on a substantially transverse horizontal axis. The controlling aerofoil 28, in this case, is connected immovably or fixed on the aileron, preferably at the outer end thereof. The control aerofoil in this case is shown positioned to the rear of the aileron axis, and when thus positioned it would be inclined downwardly and outwardly, as shown, so that the vertical component of the force on the aerofoil would be in a downward direction at right angles to the aileron axis during side slip to the right, thus moving the aileron 27 downwardly to increase the lift on this side of the airplane. Of course if the aerofoil 28 is provided in front of the aileron axis it would be inclined oppositely so that it would still move or tend to move the aileron on the low side of the airplane in a downward direction to increase the lift. This construction forms a very simple arrangement for providing automatic lateral stability.

In Fig. 5 the two sustaining surfaces 30 and 31 are provided with ailerons 32 and 33 which are connected by a laterally inclined aerofoil 34, which in this case inclines downwardly and inwardly due to the fact that the points of connection 35 and 36 are in front of the aileron axes. Thus there would be an upward force on the control surface 34 during side slip, which would move the ailerons downwardly to increase their angles of incidence and thus tend to restore the airplane to a position of equilibrium.

In accordance with Fig. 6, the laterally inclined aerofoil 38 is rigidly connected by an arm 39 to a lateral control surface 40, pivotally connected at 41 to the fixed sustaining surface 42. The aerofoil 38, like the aerofoils 34 of Fig. 5, 28 of Fig. 4 and 24 of Fig. 1, is arranged so that it extends substantially parallel to the line of forward flight and thus offers little resistance to normal forward travel of the airplane, but is affected during side slip, due to its lateral inclination and its direct connection to the lateral control surface to create a restoring movement and thus right the airplane.

It will now be apparent that in accordance with this invention a very simple construction is provided, and one that offers practically no increased head resistance during normal flight, but that is adapted to come into operation immediately during sidewise movements of the airplane. A dihedral angle need not be given to the fixed sustaining surfaces, as the automatic operation of the control aerofoil effectively takes care of any side slip or excessive angular lateral tilting of the airplane.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft, a lateral control means movable about an axis extending transversely of the aircraft, and an aerofoil pivotally connected directly to said means for automatically operating said means to correct for side slip, said aerofoil being laterally inclined but presented endwise in normal forward flight.

2. In an aircraft, a pair of lateral control surfaces movable in unison about axes extending transversely of the aircraft and provided at the same side of the aircraft, and an aerofoil arranged at a definite lateral inclination with respect to the line of forward flight and pivotally connected to both said surfaces for automatically operating said surfaces to correct for side slip, said aerofoil lying in a plane substantially parallel to the line of forward flight.

3. In an aircraft, a pair of lateral control surfaces pivotally mounted one above the other on axes extending substantially transversely to the line of flight, and an aerofoil interconnecting said surfaces for automatically operating said surfaces to correct for side slip, said aerofoil being arranged at a lateral inclination relatively to said axes and presenting a substantial surface laterally for the producton of a substantial force component directly on the lateral control surfaces at right angles to said axes during sidewise movement of the aircraft.

4. In an aircraft, a pair of superposed supporting surfaces, a pair of ailerons pivotally mounted on said supporting surfaces at each side of the aircraft, and a control aerofoil at each side of the aircraft inclined downwardly and outwardly and interconnecting superposed ailerons at points to the rear of the aileron axes, said control aerofoils presenting substantial surfaces laterally for the production of substantial force components at right angles to the aileron axes during sidewise movement of the aircraft, and means for manually controlling the movements of said ailerons.

5. In an aircraft, a pair of superposed supporting surfaces, a pair of ailerons pivotally mounted on said supporting surfaces at each side of the aircraft, and a control aerofoil at each side of the aircraft inclined downwardly and inwardly and interconnecting superposed ailerons at points in front of the aileron axes, said control aerofoils presenting substantial surfaces laterally for the production of substantial force components at right angles to the aileron axes during sidewise movement of the aircraft, and means for manually controlling the movements of said ailerons.

In testimony whereof I hereto affix my signature.

ERNEST W. DICHMAN.